(12) United States Patent
Paulus et al.

(10) Patent No.: US 12,421,070 B2
(45) Date of Patent: Sep. 23, 2025

(54) MEASUREMENT DEVICE AND METHOD FOR DETECTING LOCAL THICKENINGS IN A FILM WEB

(71) Applicant: Covestro Intellectual Property GmbH & Co. KG, Leverkusen (DE)

(72) Inventors: Alexander Paulus, Leverkusen (DE); Klaus Meyer, Dormagen (DE); Joerg Nickel, Dormagen (DE); Jan Holtermann, Neuss-Grefrath (DE)

(73) Assignee: Covestro Deutschland AG, Leverkusen (DE)

( * ) Notice: Subject to any disclaimer, the term of this patent is extended or adjusted under 35 U.S.C. 154(b) by 306 days.

(21) Appl. No.: 17/778,903

(22) PCT Filed: Dec. 7, 2020

(86) PCT No.: PCT/EP2020/084835
§ 371 (c)(1),
(2) Date: May 23, 2022

(87) PCT Pub. No.: WO2021/116001
PCT Pub. Date: Jun. 17, 2021

(65) Prior Publication Data
US 2022/0412724 A1    Dec. 29, 2022

(30) Foreign Application Priority Data
Dec. 12, 2019   (EP) ..................... 19215539

(51) Int. Cl.
*B65H 26/02*   (2006.01)
*B29C 48/00*   (2019.01)
(Continued)

(52) U.S. Cl.
CPC ......... *B65H 26/02* (2013.01); *B29C 48/0022* (2019.02); *B29C 48/21* (2019.02);
(Continued)

(58) Field of Classification Search
CPC ............ B65H 2553/61; B65H 2511/13; B65H 2404/144; B65H 2404/1441; B65H 2404/1442; B65H 26/02
See application file for complete search history.

(56) References Cited

U.S. PATENT DOCUMENTS

| 4,609,336 A | 9/1986 | Stevenson et al. |
| 4,901,577 A * | 2/1990 | Roberts ................... B41F 33/02 73/159 |

(Continued)

FOREIGN PATENT DOCUMENTS

| CN | 110219157 A | 9/2019 |
| CN | 110231345 A | 9/2019 |
| JP | 2002104701 A | 4/2002 |

OTHER PUBLICATIONS

International Search Report, PCT/EP2020/084835, date of mailing: Jan. 19, 2021, Authorized officer: Adam Piekarski.

*Primary Examiner* — Jeremy R Severson
(74) *Attorney, Agent, or Firm* — John E. Mrozinski, Jr.

(57) ABSTRACT

Provided is a measurement device (10) for detecting local thickenings in a film web (20), more particularly an extrusion and/or coextrusion film, having a first roll (14) for rolling on the film web (20) that can be moved along, a second roll (18) that can be supported indirectly above the film web (20) on the first roll (14) for rolling on the film web (20) that can be moved along, wherein the second roll (18) is resiliently guided in the thickness direction of the film web (20) that can be moved along, more particularly in the vertical direction, and at least one distance sensor (24) that is stationary with respect to the first roll (14) and/or to the film web (20) that can be moved along, for detecting a distance of the second roll (18). The second roll (18), which can be displaced from a local thickening of the film web (20) in the thickness direction of the film web (20), makes it (Continued)

possible to quickly and easily detect local thickenings in a film web (20).

7 Claims, 2 Drawing Sheets

(51) Int. Cl.
*B29C 48/21* (2019.01)
*B29C 48/355* (2019.01)
*B29C 48/92* (2019.01)

(52) U.S. Cl.
CPC ............ *B29C 48/355* (2019.02); *B29C 48/92* (2019.02); *B29C 2948/92152* (2019.02); *B29C 2948/92647* (2019.02); *B65H 2511/13* (2013.01); *B65H 2511/16* (2013.01); *B65H 2511/166* (2013.01); *B65H 2511/52* (2013.01); *B65H 2701/1752* (2013.01)

(56) References Cited

U.S. PATENT DOCUMENTS

| | | | |
|---|---|---|---|
| 5,762,252 A | 6/1998 | Reitano | |
| 7,686,299 B2* | 3/2010 | Herrmann | B65H 9/12 |
| | | | 271/228 |
| 2011/0192878 A1* | 8/2011 | Teranishi | B65H 16/00 |
| | | | 428/428 |
| 2012/0137533 A1* | 6/2012 | Muranaka | G07D 7/164 |
| | | | 33/833 |

* cited by examiner

MEASUREMENT DEVICE AND METHOD FOR DETECTING LOCAL THICKENINGS IN A FILM WEB

CROSS REFERENCE TO RELATED APPLICATIONS

This application is a national stage application under 35 U.S.C. § 371 of PCT/EP2020/084835, filed Dec. 7, 2020, which claims benefit of EP Application Serial No. 19215539.8, filed Dec. 12, 2019, both of which are incorporated herein by reference in their entireties.

FIELD OF THE INVENTION

The invention relates to a measurement device and a method, with the aid of which local thickenings in a film web, in particular an extruded and/or co-extruded film, can be detected.

BACKGROUND OF THE INVENTION

During the production of film webs by extrusion and/or co-extrusion, it is possible for pimple-shaped thickenings to occur in the film web, which, for example, can arise because of production defects as a result of a material accumulation or as a result of an inclusion of a contaminant in the material of the film web. There is a continuous need to be able to detect local thickenings in a film web quickly and simply, for example in order to be able to separate such defective length regions of the film web.

DETAILED DESCRIPTION OF THE INVENTION

Figure 1:
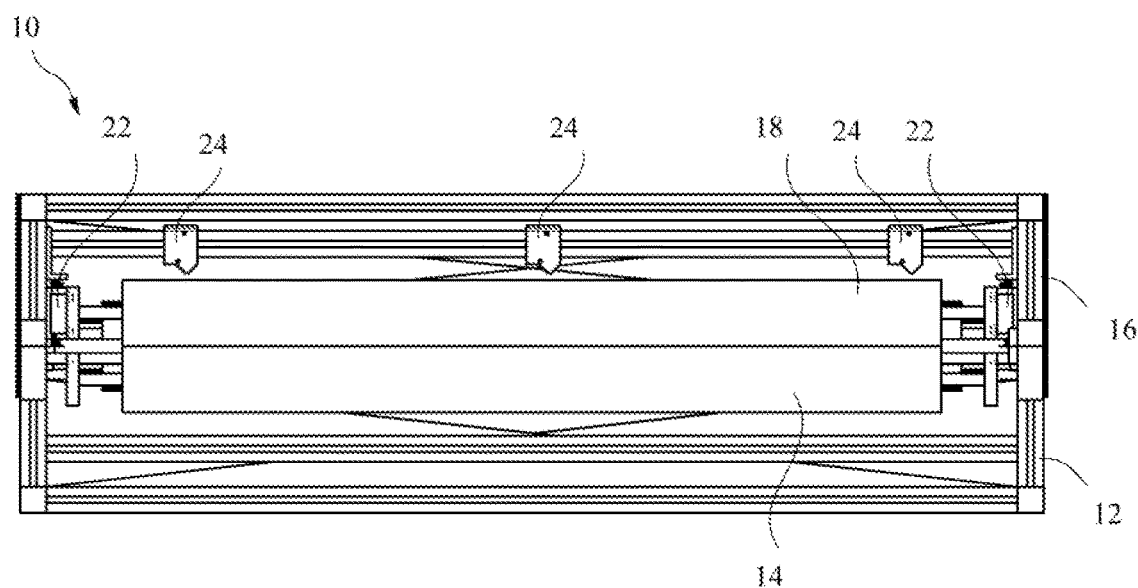
FIG. 1: shows a schematic partly sectioned front view of a measurement device.

The object of the invention is to indicate measures which permit quick and simple detection of local thickenings in a film web.

According to the invention, the object is achieved by a measurement device having the features of claim 1 and a method having the features of claim 7. Preferred embodiments of the invention are specified in the sub-claims and the following description, which can each illustrate an aspect of the invention, on their own or in combination.

One aspect of the invention relates to a measurement device for detecting local thickenings in a film web, in particular an extruded and/or co-extruded film, having a first roll for rolling on the film web that can preferably be moved along on the roll, a second roll that can be supported indirectly above the film web on the first roll, for rolling on the film web that can be moved along, wherein the second roll is resiliently guided in the thickness direction of the film web that can be moved along, in particular in the vertical direction, and at least one distance sensor, non-displaceable relative to the first roll and/or to the film web that can be moved along, for detecting a distance of the second roll.

If the film web is led through between the first roll and the second roll, it is possible that a local thickening of the film web can push the second roll away from the first roll along its linear guide. As a result, the second roll experiences a change in distance to the first roll, which can be detected by the at least one distance sensor. If the distance change detected by the distance sensor exceeds a predefined threshold value, a length region of the film web which does not meet the required quality demands with respect to the thickness of the film web can be detected as a result. With the aid of the second roll, the film web can simultaneously be sensed over the entire width and examined for local thickenings. Here, use is made of the finding that it is entirely unnecessary to know the exact position of the thickening in the width direction and/or the exact shape and size of the thickening. If the thickening in the film web is to be eliminated at a later time, in any case the appropriate length region having the thickening can be cut out of the film web, which is generally present as endless material, and, if necessary, the cut edges can be connected to each other. Additionally or alternatively, if the film web present as endless material is intended to be separated later, it is possible to take away that separated piece of film in which the thickening is present as rejects. For these measures, it is merely necessary to know the length region with the thickening detected as defective, which can be implemented quickly and simply with the aid of the second roll that can be displaced linearly in the thickness direction of the film web. By means of the second roll, which can be displaced in the thickness direction of the film web by a local thickening of the film web, quick and simple detection of local thickenings in a film web is made possible.

The second roll can, for example, be guided rotatably in a linear guide. The linear guide is in particular oriented in the thickness direction of the film web, which means in the direction of the surface normal to the length region of the film web that is located between the first roll and the second roll. Preferably, the second roll can be displaced in the vertical direction, so that in particular the second roll is supported on the first roll by its inherent weight in the direction of the force of gravity. A local thickening in the film web can displace the second roll counter to the direction of the force of gravity. Additionally or alternatively, the second roll can be pressed against the first roll with the aid of a spring. In particular, the second roll is guided in a damped manner with the aid of a damper element during the linear displacement, preferably in order to damp vibrations and/or to avoid lifting off the film web or the thickening. The first roll is in particular only rotatably mounted and non-displaceably fixed in the thickness direction of the film web. By means of the second roll supported on the first roll, natural vibrations of the measurement device can be compensated, since both rolls are displaced to the same extent during a natural vibration and a relative position of the second roll to the first roll remains constant during the natural vibration. As a result, a change in the relative position of the second roll to the first roll in the thickness direction of the film web is substantially caused exclusively by a local thickening in the film web.

In particular, the at least one distance sensor is configured as a sensor measuring without contact, in particular a laser rangefinder, wherein the second roll completely shades the first roll and/or the film web from the at least one distance sensor. As a result, the at least one distance sensor can be provided in a rear region of the second roll, pointing away from the first roll. As a result, the distance sensor can be provided in an installation space in which the distance sensor cannot interfere with other components of the measurement device and the film web. Since the second roll shades the first roll and/or the film web irrespective of the relative position of the second roll relative to the first roll along the linear guide in the thickness direction of the film web, impairment of the measurement result of the distance sensor by the first roll can reliably be avoided. A situation in which a measurement signal emitted by the distance sensor is at least partly reflected from the first roll and/or from the film web can be reliably avoided as a result. Since the distance sensor does not sense the film web directly but only indirectly via the second roll, the number of distance sensors and/or the complexity of the distance sensors can be reduced. Here, use is made of the finding that a local thickening of the film web displaces the second roll linearly as a whole, so that the distance sensors need to detect only the distance change of the second roll. To this end, it may even be sufficient if only exactly one distance sensor observes any point of the second roll along its longitudinal extent. Preferably, two to six, particularly preferably three to five, distance sensors are provided. In particular, the at least one distance sensor is configured to detect a distance change of the second roll in the thickness direction of the film web of at least 12.0 µm, in particular at least 10.0 µm, preferably at least 8.0 µm, more preferably at least 5.0 µm and particularly preferably at least 3.0 µm, which is easily possible with the aid of a distance sensor configured as a laser rangefinder.

Preferably, the first roll is rotatably mounted in a first frame part, wherein the second roll is rotatably mounted and linearly guided in a second frame part, wherein the second frame part is coupled to the first frame part such that it can be pivoted between a closed position and an open position, wherein in particular the second frame part can be locked against movement with the first frame part when in the closed position. For maintenance work and/or in order to thread in a film web, the measurement device can be opened. To this end, for example, a stop buffer, for example a rubber buffer, can be provided, which the second frame part can strike when reaching the open position. Additionally or alternatively, a stop buffer, for example a rubber buffer, can be provided, which the second frame part can strike when reaching the closed position. As a result, the end positions of the second frame part can be definitely predefined, and damage from too hard an impact can be avoided. As a result of locking the second frame part with the first frame part in the closed position, for example by means of clipping, clamping, screw fixing, latching or the like, securing in a fixed location can be achieved, so that the measurement device can only vibrate as a whole as a result of natural vibrations. A relative movement of the second roll relative to the first roll as a result of natural vibrations of the measurement device can be avoided as a result. Coverings, for example grooved aluminum profiles with attached surface elements, can be fixed to the frame parts in order to house the rolls and the distance sensors. Penetration of contaminants which could impair the measurement is avoided as a result. In addition, when laser light is used for the at least one distance sensor, an escape of laser light can be avoided and sufficient working protection can be ensured. The first frame part and the second frame part can be coupled to each other via gas pressure springs or the like in order to damp the opening and/or closing of the measurement device.

Particularly preferably, the at least one distance sensor is fixed to the second frame part. If the second frame part is non-displaceably fixed to the first frame part, it is sufficient if the distance sensor detects the distance change of the second roll relative to the second frame part, since this is identical to the distance change of the second roll to the first frame part and the first roll. The complexity of the measurement technology can be reduced as a result, and the at least one distance sensor can easily be positioned in a non-critical installation space.

In particular, an evaluation device coupled to the at least one distance sensor is provided, wherein the evaluation device is configured to output a signal in the event of a distance change of the second roll relative to the at least one distance sensor that exceeds a predefined threshold value, wherein the signal can be further processed by a marking device that can be connected to the evaluation device for marking a length section of the film web that is judged to be defective and/or by a cutting device that can be connected to the evaluation device for severing a length section of the film web that is judged to be defective. The evaluation device can, for example, compare the distance change of the second roll measured by the at least one distance sensor with a threshold value, in order to avoid too sensitive a reaction and to permit negligible thickness fluctuations of the film web. If the evaluation unit establishes that there is a defect caused by a local thickening, in that the detected distance change exceeds the threshold value, the evaluation unit can arrange for appropriate measures as a result of the generated signal. For example, with the aid of the signal, the marking device can be caused to mark the defective length region of the film web by means of a label stuck on. By using this label and/or the signal transmitted from the evaluation device, the cutting device can cut out the defective length region.

A further aspect of the invention relates to a conveying section for conveying a film web, in particular an extruded and/or co-extruded film, having a forward drive device for driving the film web forward, a measurement device, which can be configured and developed as described above, for detecting local thickenings in the film web guided through the measurement device, a web cleaning device connected upstream of the measurement device for separating contaminants, in particular for neutralizing static charges by means of at least one applied ion cloud and/or extracting the contaminants, wherein in particular the measurement device is supported and/or spring-mounted separately as a whole. The web cleaning device can, for example, remove contaminants adhering electrostatically to the film web, so that the measurement device detects only contaminants that can no longer be removed, in the form of local thickenings of the film web. As a result of the separate supporting and/or spring-mounting of the entire measurement device, the measuring device can be decoupled from the natural vibrations of the remaining components of the conveying section. Unnecessary vibrations and/or shocks, which could impair the measurement, are avoided as a result. By means of the second roll, which can be displaced in the thickness direction of the film web by a local thickening of the film web, quick and simple detection of local thickenings in a film web is made possible.

A further aspect of the invention relates to a method for detecting local thickenings in a film web, in particular an extruded and/or co-extruded film, in particular with the aid of a measurement device which can be configured and developed as described above, comprising the steps of moving the film web through between a first roll and a second roll supported on the first roll, wherein the second roll is guided resiliently in the thickness direction of the film web that can be moved along, in particular in the vertical direction, detecting a distance change of the second roll relative to the first roll, caused by the local thickenings, and outputting a signal in the event that a distance change of the second roll exceeding a predefined threshold value is detected, wherein in particular the signal can be further processed by a marking device for marking a length section of the film web that is judged to be defective and/or a cutting device for severing a length section of the film web that is judged to be defective. By means of the second roll, which can be displaced in the thickness direction of the film web by a local thickening of the film web, quick and simple detection of local thickenings in a film web is made possible. Otherwise, the method can be configured and developed as described above.

The measurement device 10 illustrated in FIG. 1 has a first roll 14 rotatably mounted in a lower, first frame 12, and a second roll 18 rotatably mounted in an upper, second frame 16. A film web 20 can be led through between the first roll 14 and the second roll 18 supported on the first roll 12 by a forward drive device. The second roll 18 is additionally resiliently guided in the thickness direction of the film web 20 which, in the present exemplary embodiment, coincides with the vertical direction, with the aid of a linear guide 22. Should the film web 20 have a local thickening, during the transport of the film web 20 between the rolls 14, 18, this thickening can push the second roll 18 away from the first roll 14 in the thickness direction counter to the direction of the force of gravity. With the aid of at least one distance sensor 24 connected to the second frame 16, this displacement of the second roll 18 can be measured as a distance change. Here, the shortening of the distance of the second roll 18 to the distant sensor 24 corresponds to an enlargement of the distance of the second roll 18 relative to the first roll 14 and/or to the film web 20, caused by the local thickening of the film web 20. If the distance change measured by the distance sensor 24 exceeds a tolerable extent depicted with the aid of a predefined threshold value, the length section of the film web 20 that is identified as defective as a result can be marked and/or cut out.

Figure 2:
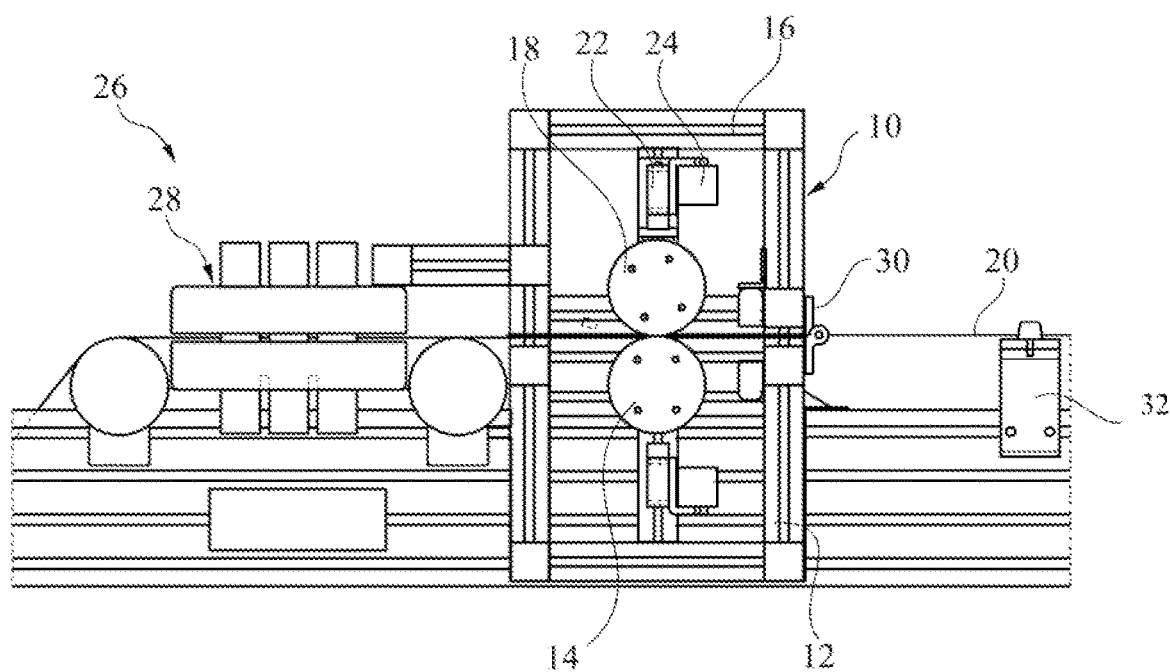
FIG. 2: shows a schematic partly sectioned side view of a conveying section with the measurement device from FIG. 1.

As illustrated in FIG. 2, a conveying section 26 provided to transport the film web 20 can have a web cleaning device 28 connected upstream of the measurement device 10. The web cleaning device 28 can suck and/or blow away contaminants on the surfaces of the film web 20. In particular, the web cleaning device 28 can remove electrostatically adhering contaminants in that the web cleaning device 28 applies at least one ion cloud to the surfaces of the film web 20, in order to be able to neutralize and more easily separate off the electrically adhering contaminants.

Figure 3:
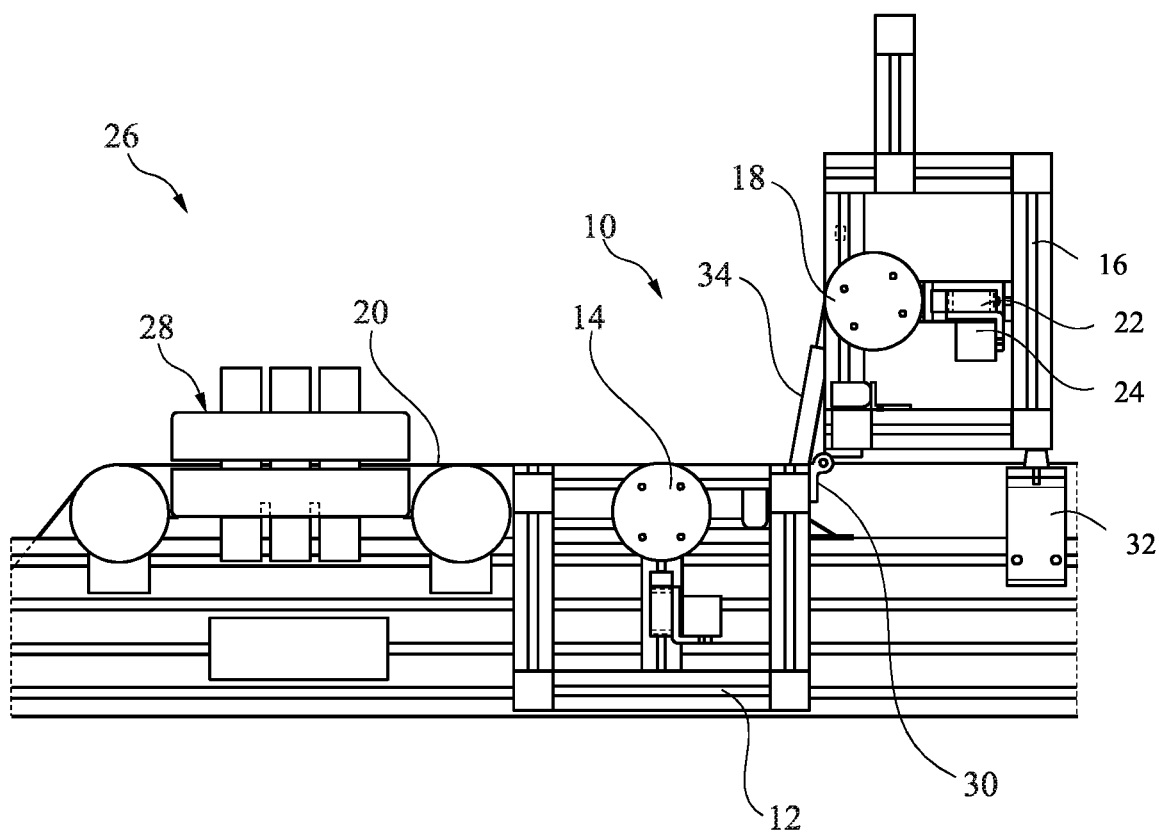
FIG. 3: shows a schematic partly sectioned side view of the conveying section from FIG. 2 with the measurement device in an open position.

The first frame 12 and the second frame 16 can be coupled pivotably to each other via a hinge 30. In the closed position illustrated in FIG. 2, the second frame 16 can additionally be non-detachably connected to the first frame 12, in particular detachably locked, in order that natural vibrations of the measurement device 10 occur identically in both rolls 14, 18. In the open position of the measurement device 10, illustrated in FIG. 3, the second frame 16 is opened through about 90°. Here, the second frame 16 can rest on a rubber buffer 32 defining the end position in the open position. The pivoting movement of the second frame 16 can be damped with the aid of gas pressure springs 34 fixed to the first frame 12 and to the second frame 16.

The invention claimed is:

1. A measurement device for detecting local thickenings in a film web (20) comprising at least one of an extruded film and a co-extruded film, having
   a first roll (14) for rolling on the film web (20) configured to be moved along continuously,
   a second roll (18) that can be supported indirectly above the film web (20) on the first roll (14) for rolling on the film web (20) configured to be moved along continuously,
   wherein the second roll (18) is resiliently guided in the thickness direction of the film web (20) configured to be moved along continuously in the vertical direction,
   wherein at least one distance sensor (24), fixed in position relative to at least one of the first roll (14) and the film web (20) configured to be moved along continuously for detecting a distance of the second roll (18) during continuous movement of the film web,
   wherein the first roll (14) is rotatably mounted in a first frame part (12),
   wherein the second roll (18) is rotatably mounted and guided linearly in a second frame part (16),
   wherein the second frame part (16) is coupled to the first frame part (12) configured to be pivoted between a closed position and an open position for maintenance access to the continuously moving film web, and
   wherein, the second frame part (16) is configured to be locked against movement with the first frame part (12) when in the closed position to maintain stable measurement conditions during continuous film web movement.

2. The measurement device as claimed in claim 1, characterized in that the at least one distance sensor (24) is configured as a sensor measuring without contact, wherein the second roll (18) completely shades at least one of the first roll (14) and the film web (20) from the at least one distance sensor (24).

3. The measurement device as claimed in claim 1, characterized in that the at least one distance sensor (24) is fixed to the second frame part (16).

4. The measurement device as claimed in claim 1, further including an evaluation device coupled to the at least one distance sensor (24), wherein the evaluation device is configured to output a signal in the event of a distance change of the second roll (18) relative to the at least one distance sensor (24) that exceeds a predefined threshold value, wherein the signal can be further processed by a marking device that is configured to be connected to one of the evaluation device for marking a length section of the film web that is determined to be defective and a cutting device configured to be connected to the evaluation device for severing a length section of the film web (20) that is determined to be defective.

5. A conveying section for conveying a film web (20), comprising one of an extruded film and a co-extruded film, having a forward drive device configured for driving the film web (20) forward, a measurement device (10) as claimed in claim 1 for detecting local thickenings in the film web (10) guided through the measurement device (10), a web cleaning device (28) connected upstream of the measurement device (10) configured for at least one of separating contaminants, neutralizing static charges by means of at least one applied ion cloud and extracting the contaminants.

6. A method for detecting local thickenings in a film web (20), comprising at least one of an extruded film and a co-extruded film during continuous production line operation, with aid of a measurement device (10) as claimed in claim 1, the method comprising the steps
   continuously moving the film web (20) between the first roll (14) and the second roll (18) supported on the first roll (14) during ongoing extrusion or co-extrusion production, wherein the second roll (18) is guided resiliently in the thickness direction of the film web

(20) during continuous movement in the vertical direction while maintaining stable measurement conditions through a locked frame configuration, continuously detecting a distance change of the second roll (18) relative to the first roll (14) during continuous movement of the film web, the distance changes being caused by pimple shaped local thickenings that occur during the extrusion or co-extrusion process, and outputting a real-time signal during continuous production when a distance change of the second roll (18) exceeding a predefined threshold value is detected for immediate production line response by at least one of:

(a) a marking device for marking a length section of the continuously moving film web (20) that contains the detected local thickening and (b) a cutting device for severing a length section of the film web (20) that contains the detected local thickening, wherein the detection and processing occur without interrupting the continuous production flow.

7. The measurement device as claimed in claim 1, characterized in that the at least one distance sensor (24) is a laser rangefinder.

* * * * *